United States Patent
Lee

(10) Patent No.: US 8,262,792 B2
(45) Date of Patent: Sep. 11, 2012

(54) NATURAL ADHESIVE USING GARLIC AND FABRICATING METHOD OF THE SAME

(76) Inventor: Jin Hwa Lee, Jinju (KR)

( * ) Notice: Subject to any disclaimer, the term of this patent is extended or adjusted under 35 U.S.C. 154(b) by 173 days.

(21) Appl. No.: 12/666,779

(22) PCT Filed: Jun. 27, 2008

(86) PCT No.: PCT/KR2008/003753
§ 371 (c)(1),
(2), (4) Date: Dec. 24, 2009

(87) PCT Pub. No.: WO2009/002127
PCT Pub. Date: Dec. 31, 2008

(65) Prior Publication Data
US 2011/0000396 A1    Jan. 6, 2011

(30) Foreign Application Priority Data
Jun. 28, 2007 (KR) .......................... 10-2007-0064793

(51) Int. Cl.
*C09J 199/00* (2006.01)
(52) U.S. Cl. ........................................ 106/244
(58) Field of Classification Search ................ 106/244
See application file for complete search history.

(56) References Cited

U.S. PATENT DOCUMENTS 5,788,758 A * 8/1998 Sawada et al. ............... 106/493
2005/0112393 A1* 5/2005 Fliermans ................. 428/537.1

FOREIGN PATENT DOCUMENTS

| JP | 09-163909 A | 6/1997 |
| JP | 2002-188067 A | 7/2002 |
| JP | 2006-076960 A | 3/2006 |
| KR | 10-1996-0004496 | 4/1996 |
| KR | 2004-0089829 A | 10/2004 |

OTHER PUBLICATIONS

Pedraza-Cheverri et al, Nutrition Journal, "Garlics ability . . . ", 2004, 3:10, (Sep. 2004).*
Garden Web, "Making Garlic POwder from fresh Garlic Bulbs" (Jun. 14, 2007).*
Pedro Martinez, "Garlic is Nature's Wonder Drug" (2009).*

* cited by examiner

*Primary Examiner* — David M Brunsman
(74) *Attorney, Agent, or Firm* — Rabin & Berdo, P.C.

(57) ABSTRACT

The present invention relates to a natural adhesive using garlic and a fabricating method thereof, and, more particularly to a very preservative, adhesive, nonpoisonous and high-performance natural adhesive, which is a chemical-free natural adhesive using garlic with high antibiosis as a major ingredient, capable of efficiently preventing a variety of damages due to volatile organic compounds by employing no chemicals throughout the whole fabricating procedures, and a fabricating method thereof. In detail, the present invention provides a natural adhesive using garlic fabricated by filtering and concentrating an extracted liquid obtained from a mixture of pulverized garlic and water. In addition, the present invention provides a method of fabricating a natural adhesive using garlic, including: (a) preparing and pulverizing garlic; (b) adding a solvent into the pulverized garlic; (c) extracting an extracted liquid from a mixture of the pulverized garlic and water; (d) filtering the extracted liquid; and (e) concentrating the filtered extracted liquid.

6 Claims, 3 Drawing Sheets

【Figure 1】
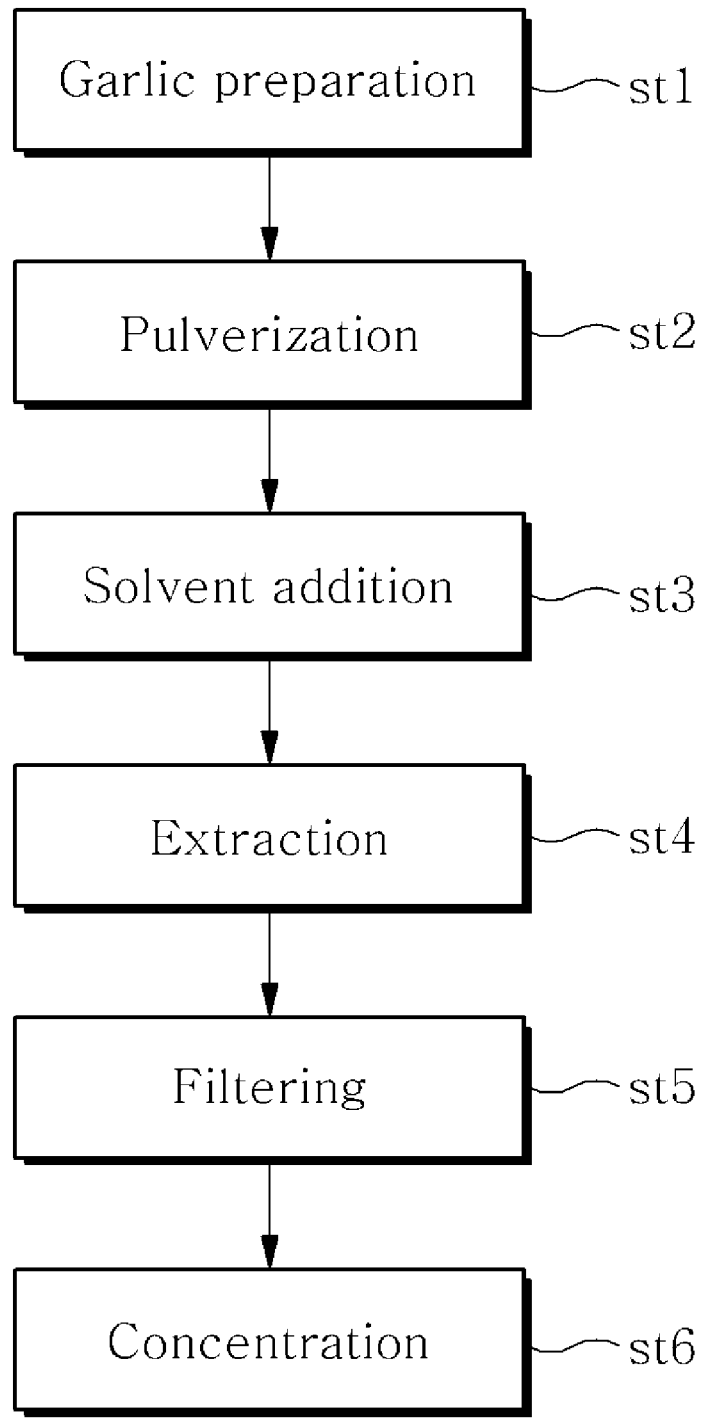

[Figure 2]
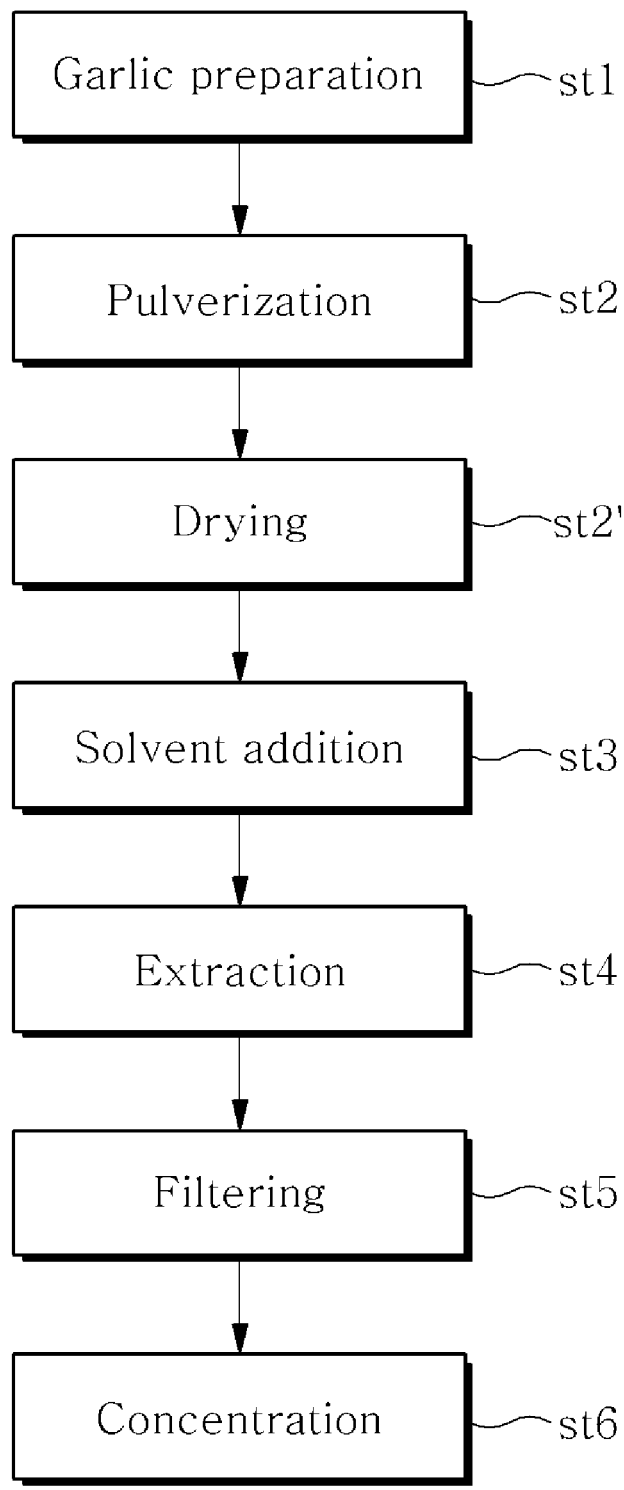

[Figure 3]
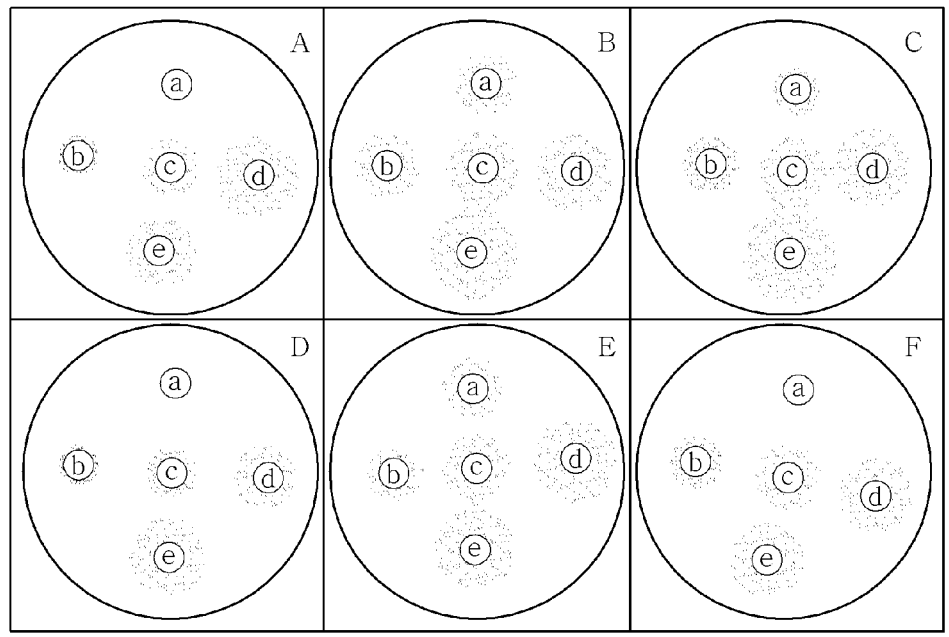
[Figure 4]
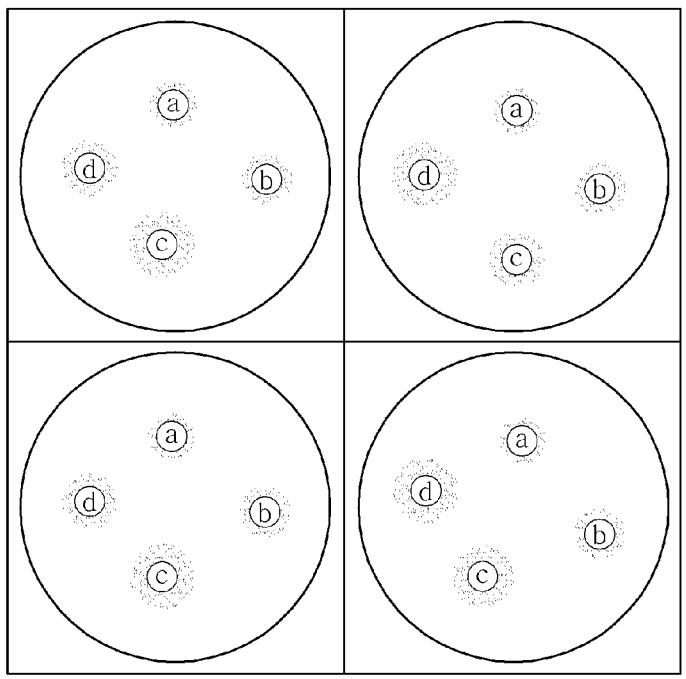

NATURAL ADHESIVE USING GARLIC AND FABRICATING METHOD OF THE SAME

TECHNICAL FIELD

The present invention relates to a natural adhesive using garlic and a fabricating method thereof, and more particularly to a high-adhesive, nonpoisonous and high-performance natural adhesive, which is a chemical-free natural adhesive using garlic with high antibiosis as a major ingredient, capable of efficiently preventing a variety of damages due to volatile organic compounds by employing no chemicals throughout the whole fabricating procedures, and a fabricating method thereof.

BACKGROUND ART

Generally, an adhesive totally refers to a substance used for combining the same kinds of objects or different kinds of objects, and refers to a high molecular substance which is liquefied at the beginning and solidified as time goes by to tightly 'adhere' to an object and is not destroyed in itself. In this case, the 'adhesion' of the adhesive is different from a 'join' in that a wetting follows the adhesion, and the wetting is a phenomenon caused by mutual similarity between the adhesive and the object. If a liquefied adhesive 'contacts' with an object, it penetrates uniformly into the object by the 'wetting' to 'combine' with the object and be solidified according to a dynamic and chemical adhesive strength of factors generating an adhesive intensity, for example, an anchor, a zipper, capillary and the like. Once the adhesive is solidified, it 'keeps' the adhesive state tightly regardless of external factors such as temperature, humidity, pressure or the like. Therefore, a good adhesive should be outstanding in all characteristics of the 'contact' the 'wetting' the 'combine' and the 'keep'. Currently, mainly employed adhesives are largely classified into an inorganic adhesive and an organic adhesive, which may be classified in detail depending on a major ingredient thereof, as shown in the following Table 1.

TABLE 1

| Inorganic Adhesive | Cement type, Sodium Silicates (water glass) type, Ceramics, others | |
|---|---|---|
| Organic Adhesive | Synthetic resins base | Thermosetting | Urea base, Melanin base, Phenol base, Unsaturated Polyester base, Epoxy base, Resorcinol base |
| | | Thermoplastic | Vinyl Acetate base, Polyvinyl Alcohol base, Vinyl Chloride base, Polyvinyl Acetal base, Acryl base, Saturated Polyester base, Polyamide base, Polyethylene base |
| | | Rubber base (Styrene type) | Butadiene Rubber base, Nitrile Rubber base, Butyl Rubber base, Silicone Rubber base, Chloroprene |
| | Rubber base | Mixture base (Phenol type) | Vinyl based Phenol-Chloroprene base |
| | | Epoxy | Polyamide base, Nitrile Rubber-Epoxy base |
| | Natural base | Dextrin base | Starch, Dextrin |
| | | Protein base | Glue, Casein |
| | | Resin base | Pine resin, Shellac |
| | | Rubber base | Latex, Mucilage Asphalt paper |

On the other hand, recently, concern about a comfortable residence environment increases gradually as an environmental pollution becomes serious, and thus an effort to reduce damages, for example, sick house syndrome, headache, atopic dermatitis, asthma and the like induced by poisonous chemicals such as formaldehyde or the like. Herein, the sick house syndrome means a phenomenon induced by volatile organic compounds ("VOCs") such as formaldehyde, benzene, toluene, xylene, ethylbenzene, acetaldehyde, dichlorobenzene, styrene, etc., and the cause thereof can be found in adhesives, construction materials and the like containing such chemicals. Thus, recently, although a demand for so-called 'Natural adhesive' which eliminates addition and use of the volatile organic compounds, if possible, increases, if the use of the volatile organic compounds is completely eliminated from the whole procedures of fabrication and production, the natural adhesive has a disadvantage that preservation thereof deteriorates to be easily contaminated by germs and the like. For this reason, a small amount of preservative ingredient such as formaldehyde is contained in most of natural adhesives available from the market. Moreover, the volatile organic compounds are used in process of fabrication and preservation of a resin, a solvent, a catalyst, a hardener, an additive and the like which are ingredients of the natural adhesive, without any restrictions.

As a result, the volatile organic compounds are evaporated in process of dry and hardening of the natural adhesive to generate a carcinogen as well as to induce ailment damages such as a sick house syndrome, for example, headache, atopic dermatitis, asthma and the like, and further to induce destruction of an ozone layer and a global warming due to photochemical smog.

DISCLOSURE

Technical Problem

It is therefore an object of the present invention to provide an environment-friendly natural adhesive with a good adhesion by completely eliminating use of volatile organic compounds from the whole procedures of fabrication and preservation, and a fabricating method thereof.

In detail, in order to accomplish the above object, the present invention relates to a nonpoisonous and high-performance natural adhesive, which is a chemical-free natural adhesive using garlic with high antibiotic capacity as a major ingredient, capable of efficiently preventing a variety of damages due to volatile organic compounds by employing no chemicals throughout the whole procedures of fabrication and preservation as well as having high workability and a good preservation owing to a superior adhesive intensity, and a fabricating method thereof.

Technical Solution

To achieve the above object, according to an aspect, the present invention provides a natural adhesive using garlic, which is fabricated by filtering and concentrating an liquid extracted from a mixture of pulverized garlic and water.

Preferably the garlic in the adhesive is pulverized and then dried, the water is mixed at a rate of 2~3 ml per 1 g of garlic, the extracted liquid is extracted at a temperature of 80° C. to 100° C. after lapse of 5 to 7 hours, and the concentration is performed at a temperature of 55° C. to 65° C. with nine to ten magnifications.

According to another aspect, the present invention also provides a method of fabricating a natural adhesive using garlic, which includes: (a) preparing and pulverizing garlic; (b) adding a solvent into the pulverized garlic; (c) extracting an extracted liquid from a mixture of the pulverized garlic and water (d) filtering the extracted liquid; and (e) concentrating the filtered extracted liquid. Preferably the method further comprises drying the garlic at a temperature of 80~100° C. for 23 to 25 hours, after the step (a) and before the step (b). Preferably the solvent of the step (b) is water, which is added at a rate of 2~3 ml per 1 g of the garlic at the step (b). Preferably the method further includes leaving a mixture of the pulverized garlic and the solvent at a temperature of 80~100° C. for 5 to 7 hours as it is, after the step (b) and before the step (c), wherein the step (c) is carried out at a temperature of 80~100° C. Preferably the concentration in the step (e) is carried out at a temperature of 55~65° C. at a rate of 9 to 10 magnifications.

Advantageous Effects

The natural adhesive according to the present invention has a good adhesion and shows environment-friendly and safe characteristics, since no volatile organic compounds are used in the whole procedures of the fabrication and preservation. In particular, the natural adhesive according to the present invention has good preservation and antibiosis characteristics by using garlic with good antibiotic capacity as a major ingredient, and thus, it can be safe in use when it is applied to interior material such as wallpaper, etc.

DESCRIPTION OF DRAWINGS

FIG. 1 is a flow chart to illustrate a method of fabricating a natural adhesive according to a first embodiment of the present invention;

FIG. 2 is a flow chart to illustrate a method of fabricating a natural adhesive according to a second embodiment of the present invention; and FIGS. 3 and 4 are pictures to illustrate antibiotic characteristics of the natural adhesive according to the present invention.

BEST MODE

The present invention will now be described in detail with reference to the accompanying drawings.

Prior to detailed description, 'a natural adhesive using garlic' (hereinafter, abbreviated to "natural adhesive") according to the present invention is classified into two embodiments such as a first embodiment and a second embodiment depending on its aspect, and, for convenience, the first embodiment will be described in detail while the second embodiment will be mainly described for differences therebetween.

First Embodiment

FIG. 1 is a flow chart to illustrate a process of fabricating a natural adhesive according to a first embodiment of the present invention.

As shown, garlic is prepared and then washed (st1). The prepared garlic is typical raw garlic easily available from the market. In the specification, NAMHAE garlic is employed for test. After being peeled, the garlic is washed to remove impurities such as soil, roots, branches, leaves and the like from the garlic.

Then, the washed garlic is pulverized (st2). At this time, a homogenizer may be used for the pulverization of the garlic, and the garlic is pulverized finely, if possible, so that a particle size thereof can be small.

Subsequently, a solvent is added to the pulverized garlic (st3). The solvent may be preferably water which is added at a rate of 2~3 ml, preferably, 2.5 ml, per 1 g of garlic.

Successively, a liquid component is extracted from a mixture of the water and the garlic and is then filtered (st4 and st5). The extraction of the liquid component is performed after lapse of 5 to 7 hours, preferably, 6 hours from the addition of the solvent, and, an extraction temperature may be 80~100° C., preferably, 90° C. Between the extraction and the filtering, a supernatant is obtained from the extracted liquid by centrifugal separation (7,000 rpm/30 min), and is filtered using a suitable filter (whatman No 2 filter paper).

The extracted liquid is concentrated (st5) at a concentration temperature of 55~65° C., preferably, 60° C., at a concentration rate of 9~10 magnifications, preferably, 10 magnifications. A rotary evaporator may be used for the concentration.

As a result, a natural adhesive according to the first embodiment of the present invention is obtained, which shows a type of filtering and concentrating the extracted liquid obtained from a mixture of the pulverized garlic and the water.

Second Embodiment

FIG. 2 is a flow chart to illustrate a method of fabricating a natural adhesive according to a second embodiment of the present invention. In comparison with FIG. 1, it is seen that a step of drying the pulverized garlic (st2') is added after pulverizing the garlic (st1) and before adding the solvent (st3). That is, in the method of fabricating a natural adhesive according to the second embodiment of the present invention, unlike the first embodiment, the garlic is pulverized (st1), the garlic is dried (st2') and then the solvent is added (st3). A dry oven may be used for the dry of the garlic. A dry temperature may be 80~100° C., preferably, 90° C., and the garlic is dried for 23~25 hours. Thereafter, the extraction, the filtering and the concentration steps go on in the same manner as the first embodiment (st4, st5 and st6).

With this, the natural adhesive according to the second embodiment of the present invention is obtained, which shows a type of filtration and concentration of the extracted liquid obtained from the mixture of the pulverized garlic and the water.

The natural adhesives according to the first and the second embodiments of the present invention as described above may be applied to interior material such as wallpaper or the like, providing the greatest effect. Hereinafter, properties and adhesive characteristics of the natural adhesives, for example, (1) candle drying time, (2) PH, (3) consistency viscosity, (4) nonvolatile content, (5) density, (6) adhesion performance and the like, according to the present invention will be described. For convenience of explanation, the natural adhesives according to the first and the second embodiments are referred to as "first reference sample" and "second reference sample", respectively.

The first reference sample is the natural adhesive according to the first embodiment, which is obtained by pulverizing washed raw garlic with a homogenizer, adding of 5 L of water to 2 kg of the pulverized garlic, extracting a liquid component at a temperature of 90° C. after lapse of 6 hours, obtaining and filtering supernatant from the extracted liquid by centrifugal separation (7,000 rpm/30 min), and concentrating it at a rate of 10 times at a temperature of 60° C. using a rotary evaporator. On the other hand, the second reference sample is obtained by further drying the pulverized garlic of 20 kg in a dry oven set to 90° C. for 24 hours, in addition to the above-described procedures.

(1) Candles Drying Time

The purpose of candles drying time is to find out drying time of a liquid, which means a time until the liquid is not detected in a hand, upon touching a liquid-coating surface. In the present invention, a method of testing a common adhesive or paint is selected. In detail, as glass for measuring a candle drying time, usual plate glass which is colorless and transparent and has clean both surfaces is selected. The plate glass is cut and a section of the cut glass is grinded by a grindstone, such as emery powder, to be made into a circle shape, then is cleaned in boiling water of alkali liquid such as soap, detergent or the like, and finally is washed with a mixture of ethyl alcohol and toluene to be dust-free. If new plate glass is used, it is immersed in a mixed solution of potassium dichromate and heavy sulfuric acid for 24 hours and then is washed. Each of the first and the second reference samples of 3 g drops on the above-described cleaned glass and then is coated at a uniform thickness thereon using a film applicator of a uniform force and velocity (150 mm/sec), and a time is measured when an adhesion cannot be felt with a finger at a constant time interval while maintaining a constant temperature (20° C., 40° C. and 60° C.) and a constant humidity.

(2) PH

After diluting each of the first and the second reference samples with the same amount of distilled water, PH is measured therefor several times at 25±1° C. using a PH meter, and an average value of measured values is shown by one decimal place.

(3) Consistency Viscosity

A consistency viscosity of an adhesive is a factor having direct connection with workability and is closely associated with a nonvolatile content and an average molecular weight, and variation thereof is a criterion of a preservative stability. In the present invention, the consistency viscosity of each of the first and the second reference samples is measured two times using a viscometer (Brookfield Model DV-I+, the rotation number 100 rpm (spindle No. 2)) while maintaining a room temperature of 20° C., and an average value thereof is shown by a centipoise (cP=p/100).

(4) Nonvolatile Content

The nonvolatile content means a weight of remaining material after removing volatile material by heating an adhesive, which is material generating an actual adhesive force. In the present invention, an aluminum foil dish of a diameter of 4~5 cm is prepared and a weight thereof (W0 (g)) is measured, and, after each of the first and the second reference samples of 1.5 g is placed on the corresponding dish, a weight thereof (W1 (g)) is measured. In addition, after drying at thermal wind circulating type constant temperature of 105±1° C. for 180±5 minutes, the respective samples are cooled in a desiccator including a drying agent and then a weight thereof (W3 (g)) is measured. This procedure is repeated twice or more and an average value of results according to the following equation 1 is shown by an effective number of two ciphers.

$$\text{Nonvolatile Content (\%)} = \{(W2-W0)/(W1-W0)\} \times 100 \quad \text{Equation 1}$$

In this case, the test of the nonvolatile content is additionally performed for first to eighth comparative samples, in addition to the first and the second reference samples. The first to fourth comparative samples are obtained by the same steps as the first embodiment except for extraction after lapse of 30 minutes, 1 hour, 3 hours and 24 hours, respectively, since addition of the solvents into the pulverized garlic, and the fifth to eighth comparative samples are obtained by the same steps as the second embodiment except for extraction after lapse of 30 minutes, 1 hour, 3 hours and 24 hours, respectively, since addition of the solvents into the pulverized garlic.

(5) Density

While maintaining a temperature of 20±0.5° C., the first and the second reference samples are put into a mass cylinder (100 ml) whose weight is known, up to 100 ml without bubbles, and then a weight thereof is measured using a balance (balance weight 500 g, weight reduction 0.5 g) to be calculated according to the following equation 2.

$$S=(W1-W2)/100 \quad \text{Equation 2}$$

where, S: density (g/m³), W1: weight (g) of the reference sample and the mass cylinder, and W2: weight (g) of the mass cylinder.

(6) Adhesive Performance: 180° Peeling Intensity

The present invention has employed a test method of starch based adhesive for wallpaper. In other words, after preparing a plywood with no cracked gap or flaw and with a thickness of 5 mm (125×150 mm), the first and the second reference samples are coated uniformly with 50 g/m² thereon, 5 minutes later, cotton (117 g/m²) of 175×150 mm covers it, and a load of 49N is added thereon using a roller to be pressed five times in one way direction, not to go and return, then leaving as it is for 48 hours while maintaining 20° C. Thereafter, five test pieces are formed at an interval of 25 mm using a cutter, the cotton on one side of the test piece is peeled up to 50 mm, the plywood and the cotton of the corresponding portion are attached to jigs of an tension tester, an interval between the jigs increases at a speed of 200 mm/min until the adhesive portion of the test piece becomes about 10 mm, a tension load value is measured according to the peeling of the test piece, and then an average of maximal tension load values of injury portions becomes 180° peeling intensity, which is shown by N/25 mm. In this case, a destruction load of the test piece is preferably within a range of 15~80% of a capacity of the tension tester, and in particular this adhesive performance test is additionally performed for the first to eighth comparative samples. Like the nonvolatile content test, the first to fourth comparative samples are obtained by the same steps as the first embodiment except for extraction after elapse of 30 minutes, 1 hour, 3 hours and 24 hours, respectively, since addition of the solvents into the pulverized garlic, and the fifth to eighth comparative samples are obtained by the same steps as the second embodiment except for extraction after elapse of 30 minutes, 1 hour, 3 hours and 24 hours, respectively, since addition of the solvents into the pulverized garlic.

The following table 2 shows results of measuring the candles drying time, the PH, the consistency viscosity, the nonvolatile content, and the density.

TABLE 2

| Test Items | | First reference sample | Second reference sample |
|---|---|---|---|
| Nonvolatile Content(%) | | 62.0 | 63.5 |
| Density(g/cm³) | | 1.3 | 1.3 |
| Consistency Viscosity(cP) | | 2,789 | 2,118 |
| PH | | 6.560 | 4.919 |
| Candles Drying time (° C./min.) | 20° C. | 25 | 20.6 |
| | 40° C. | 19 | 16 |
| | 60° C. | 6 | 5 |

As shown, in the nonvolatile content, the second reference sample is a little higher than the first reference sample, but the densities thereof are the same. In addition, in the consistency viscosity, the first reference sample represents neutrality, and the second reference sample represents acidity. The candle drying time is faster as a temperature increases, and the second reference sample is faster than the first reference sample at 20° C., in the candle drying time. As a result, the natural adhesive according to the first and second embodiments can be dried within 20 minutes under a usual condition of 20° C., and especially the consistency viscosity thereof is much lower than that of the existing starch based resin which is higher in an extent beyond measurement, resulting in good workability.

The following table 3 shows test results for the nonvolatile content and the adhesive performance of the first and second reference samples according to the present invention and the first to eighth comparative samples. As the nonvolatile content increases, the adhesive intensity becomes greater, and, the first reference sample is more or less better than the second reference sample up to the nonvolatile content of 60%.

TABLE 3

| Samples | Extraction Time | Nonvolatile Content | 180° peeling intensity (N/25 mm) |
|---|---|---|---|
| First Comparative Sample | 30 min | 41 | 3.8 ± 0.6 |
| Second Comparative Sample | 1 hr | 47 | 6.6 ± 0.7 |
| Third Comparative Sample | 3 hrs | 54 | 9.8 ± 1 |
| First Reference Sample | 6 hrs | 62 | 14.3 ± 1.2 |
| Fourth Comparative Sample | 24 hrs | 70 | 15.4 ± 2 |
| Fifth Comparative Sample | 30 min | 41 | 2.4 ± 0.7 |
| Sixth Comparative Sample | 1 hrs | 46 | 4.4 ± 1.6 |
| Seventh Comparative Sample | 3 hrs | 53 | 7.9 ± 2.5 |
| Second Reference Sample | 6 hrs | 63.5 | 15.7 ± 2 |
| Eighth Comparative Sample | 24 hrs | 70 | 15.9 ± 5.7 |

In addition, test has been made for samples obtained by adding, one (5 L) of EtOH, MeOH, Hexane, $CHCl_3$, BuOH as a solvent other than water to pulverized garlic or dried garlic after pulverization, respectively, with other steps being the same as the first and the second reference samples; however, they do not show adhesive strengths suitable for an adhesive after concentration. Furthermore, even when water is used as a solvent, test has been made for various ratios of raw garlic:water such as 1:1, 1:2, 2:2 and the like; however, an extraction yield has been the highest when a ratio of raw garlic:water was 1:1.25. As a result, it can be ascertained that the fabricating process according to the first and second embodiments of the present invention, that is, the fabricating process of the natural adhesives according to the first and second embodiments are optimal in terms of a fabricating yield and an adhesive strength.

For reference, the following tables 4 and 5 show test results of an adhesive strength and a nonvolatile content about starch base, Pleuran which is microbial agent, micro capsulated essential oil and PVAc (Polyvinyl Acetate) of existing adhesives for wallpaper.

TABLE 4

| Samples | 180° peeling intensity (N/25 mm) |
|---|---|
| First Reference Sample | 14.3 |
| Second Reference Sample | 15.7 |
| Starch base | 8.4 |
| PAVc | 17.5 |

TABLE 5

| Samples | Nonvolatile Content(%) |
|---|---|
| First Reference Sample | 62.0 |
| Second Reference Sample | 63.5 |
| Starch base | 16.5 |
| Pleuran | 8.0 |
| Essential Oil | 30.0 |
| PVAc | 42.0 |

As shown in Table 4, the adhesive strength of the first and second reference samples is better than the starch based adhesive; in contrast, is worse than the PVAc, and, referring to Table 5, the first and second reference samples and the existing adhesives are very different in the nonvolatile content, and especially the existing products are predicted to employ the nonvolatile content no longer due to degradation of workability, and thus it can be known that the first and second reference samples are relatively better in performance.

On the other hand, the natural adhesives according to the first and second embodiments show an excellent antibiotic capacity by using garlic as a major ingredient. Hereinafter, (7) antibiotic characteristics against germ and (8) antibiotic characteristics against a mold of each of the first and second reference samples which are the natural adhesives according to the first and the second embodiments will now be described.

(7) Antibiotic Activity Against Germ

In the present invention, the antibiotic activity against germ has been measured on the basis of an agar diffusion method. That is, aqueous culture mediums 50 μl each of poisonous microorganisms shown in the following Table 6 is inoculated into a Muller Hinton culture medium containing soft agar 0.6% to be mixed well, and then it is made into dual layers in a Mueller Hinton planar culture medium which is prepared in advance. Thereafter, arbitrarily, the first reference samples of 1, 3, 5, 7, and 9 mg/ml are absorbed into a paper disc (Toyo Rhosikaisha, Ltd, 8 mm) to be put on the dual-layer culture medium for culturing in a thermostat set to 35° C. In such state, a clear zone showing an obstruction to culturing of the poisonous microorganism has been measured.

TABLE 6

| Groups | Strains |
|---|---|
| Gram(+) | Bacillus cereus KCCM-11204 |
|  | Staphylococcus aureus KCTC-1927 |
| Gram(−) | Pseudomonas aeruginosa ATCC-15442 |
|  | Escherichia coli ATCC-25922 |
|  | Salmonella typhiumurium KCTC-2208 |
|  | Vibrio parahaemolyticus |

The results thereof are shown in FIG. 3, and germs used for test are as follows, and the respective small letters, a to e, in FIG. 3 represent an amount of the natural adhesive, which are (a) 1 mg/ml, (b) 3 mg/ml, (c)5 mg/ml, (d) 7 mg/ml, and (e) 9 mg/ml.

A, *Bacillus cereus* KCCM-11204

B, *Escherichia coil* ATCC-25922

C, *Pseudomonas aeruginosa* ATCC-15442

D, *Staphylococcus aureus* KCTC-1927

E, *Salmonella typhiumurium* KCTC-2208

F, *Vibrio parahaemolyticus*

Referring to the corresponding figure, the natural adhesive according to the present invention is ascertained to show a high antibiotic activity on the whole, particularly, to show a high antibiotic activity against *Escherichia coil, Pseudomonas aeruginosa* and *Salmonella typhiumurium*, which begins to show antibiosis from 1 mg/ml against them and maintains a high antibiosis up to 3~9 mg/ml, and begins to show antibiosis from 3 mg/ml against *Bacillus cereus, Staphylococcus aureus*, and *Vibrio parahaemolyticus*.

(8) Antibiotic Activity Against Mold

Likewise, the antibiotic activity against a mold has been measured on the basis of the agar diffusion method. That is, sterile distilled water of 910 each is divided in the mold strains shown in the following Table 7, cultured in a planar culture medium to suspend Foggia and then a Foggia liquid 1 ml is made into dual layers in a PDA dual-layer culture medium containing a soft agar 0.6%. Thereafter, arbitrarily, the first reference samples of 1, 3, 5, and 7 mg/ml are absorbed into a paper disc (Toyo Rhosikaisha, Ltd, 8 mm) to be put on the dual-layer culture medium for culturing in a thermostat set to 35° C. In such state, a clear zone showing an obstruction to culturing of the poisonous microorganism has been measured.

TABLE 7

| Groups | Strains |
|---|---|
| Molds | *Mucor javanicus* AM-2 |
|  | *Penicillium* sp. |
|  | *Aspergillus niger* IFO-31125 |
|  | *Rhizopus microsporus* KCTC-6969 |

The results thereof are shown in FIG. 4, and molds used for test are as follows, and the respective small letters, a to d, in FIG. 4 represent an amount of the natural adhesive, which are (a) 1 mg/ml, (b) 3 mg/ml, (c) 5 mg/ml, and (d) 7 mg/ml.

A, *Mucor javanicus* AM-2

B, *Penicillium* sp.

C, *Aspergillus niger* IFO-31125

D, *Rhizopus microsporus* KCTC-6969

Referring to the corresponding figure, the natural adhesive according to the present invention is ascertained to show a high antibiotic activity against the molds on the whole, particularly, to show the highest antibiotic activity at a concentration 5 mg/mC however, in a case of *Penicillium*, to show the highest antibiotic activity at a concentration 7 mg/ml.

On the other hand, test results for a case of use of mixing the natural adhesives according to the first and second embodiments and the existing adhesives are shown in the following Table 8 which is test results of an adhesive performance after mixing the starch base and the Pleuran base of the existing adhesives for wallpaper into the first and second reference samples at various ratios, and the test has been performed under a circumstance of average 25° C. in consideration of a work situation.

TABLE 8

|  | Component Ratio | 180° peeling intensity (N/25 mm) | |
|---|---|---|---|
| Additive | (Reference sample:additive) | First Reference sample | Second Reference sample |
| Starch base | 10:0 | 20.1 ± 3.3 | 8.1 ± 1.7 |
|  | 9:1 | 15.4 ± 4.4 | 6.1 ± 1.2 |
|  | 7:3 | 4.8 ± 1.2 | 3.9 ± 0.8 |
|  | 5:5 | 3.2 ± 0.9 | 2.6 ± 0.7 |
| Pleuran | 10:0 | 20.1 ± 3.3 | 8.1 ± 1.7 |
|  | 9:1 | 19.2 ± 2.6 | 8 ± 1.6 |
|  | 7:3 | 6.5 ± 3.7 | 4.1 ± 0.9 |
|  | 5:5 | 1.9 ± 0.6 | 1.3 ± 0.8 |

As shown by the above results, the first and second reference samples according to the present invention have a tendency that, as addition ratio of the existing product is higher, rather an adhesive intensity thereof is lower, and, in a case of addition of the micro-capsulated essential oil, the reference samples generates an adhesive performance little and thus the test itself has been impossible.

The following Table 9 shows test results for an adhesive performance after adding the starch base and PVAc which are the existing products to the first and second reference samples according to the present invention at mutually different ratios, and the first and second natural adhesives according to the present invention show the best adhesive performance upon use alone. Consequently, organic compounds have no room for addition in use of the natural adhesives according to the first and second embodiments. With this, the natural adhesive according to the present invention has good adhesion and shows environment-friendly and safe characteristics without use of volatile organic compounds in the whole procedures of the fabrication and use. In addition, the natural adhesive according to the present invention has good preservation and antibiosis characteristics and is healthy for a user.

TABLE 9

| Samples | Reference Sample Ratio | Starch base Ratio | PVAc Ratio | 180° Peeling Intensity (N/25 mm) |
|---|---|---|---|---|
| First Reference Sample | 0 | 0 | 10 | 17.5 ± 3.4 |
|  | 0 | 10 | 0 | 8.4 ± 1.1 |
|  | 10 | 0 | 0 | 14.3 ± 1.2 |
|  | 5 | 5 | 0 | 3.2 ± 0.9 |
|  | 7 | 3 | 0 | 4.8 ± 1.2 |
|  | 9 | 1 | 0 | 15.4 ± 4.4 |
|  | 3 | 7 | 0 | 2.8 ± 0.8 |
|  | 2 | 8 | 0 | 2.3 ± 0.9 |
|  | 1 | 9 | 0 | 4.7 ± 0.6 |
|  | 7 | 0 | 3 | 3.5 ± 1.4 |
|  | 8 | 0 | 2 | 10.7 ± 2.8 |
|  | 9 | 0 | 1 | 13.1 ± 1.5 |
|  | 0 | 7 | 3 | 10.1 ± 2 |
|  | 0 | 8 | 2 | 11.3 ± 2.1 |
|  | 0 | 9 | 1 | 10.2 ± 3.1 |
| Second Reference Sample | 0 | 0 | 10 | 17.5 ± 3.4 |
|  | 0 | 10 | 0 | 8.4 ± 1.1 |
|  | 10 | 0 | 0 | 14.3 ± 1.2 |
|  | 5 | 5 | 0 | 2.6 ± 0.7 |
|  | 7 | 3 | 0 | 3.9 ± 0.8 |
|  | 9 | 1 | 0 | 6.1 ± 1.2 |
|  | 3 | 7 | 0 | 2.7 ± 1.2 |
|  | 2 | 8 | 0 | 3 ± 0.5 |
|  | 1 | 9 | 0 | 5.4 ± 0.6 |
|  | 7 | 0 | 3 | 2.1 ± 0.9 |
|  | 8 | 0 | 2 | 7.7 ± 1.4 |
|  | 9 | 0 | 1 | 8.8 ± 2.3 |

The invention claimed is:

1. A natural adhesive using garlic, the adhesive being fabricated by filtering and concentrating an extracted liquid obtained from a mixture of pulverized garlic and water,
wherein the water is mixed at a rate of 2~3 ml per 1 g of the garlic, the extracted liquid is extracted at a temperature of 80~100° C. after lapse of 5~7 hours since the mixing of the water, and the concentration is performed at a temperature of 55~65° C. at a rate of 9 to 10 magnifications.

2. A natural adhesive using garlic, the adhesive being fabricated by filtering and concentrating an extracted liquid obtained from a mixture of pulverized garlic and water,
wherein the garlic is pulverized and then dried, and
the water is mixed at a rate of 2~3 ml per 1 g of the garlic, the extracted liquid is extracted at a temperature of 80~100° C. after lapse of 5~7 hours since the mixing of the water, and the concentration is performed at a temperature of 55~65° C. at a rate of 9 to 6 magnifications.

3. A method of fabricating a natural adhesive using garlic, comprising:
(a) preparing and pulverizing garlic;
(b) adding a solvent into the pulverized garlic;
(c) extracting an extracted liquid from a mixture of the pulverized garlic and water;
(d) filtering the extracted liquid; and
(e) concentrating the filtered extracted liquid,
wherein the method further comprises leaving a mixture of the pulverized garlic and the solvent at a temperature of 80~100° C. for 5 to 7 hours as it is, after the step (b) and before the step (c),
the step (c) is carried out at a temperature of 80~100° C., and
the solvent is water, the water being added at a rate of 2~3 ml per 1 g of the garlic at the step (b).

4. A method of fabricating a natural adhesive using garlic, comprising:
(a) preparing and pulverizing garlic;
(b) adding a solvent into the pulverized garlic;
(c) extracting an extracted liquid from a mixture of the pulverized garlic and water;
(d) filtering the extracted liquid; and
(e) concentrating the filtered extracted liquid,
wherein the concentration in the step (e) is carried out at a temperature of 55~65° C. at a rate of 9 to 10 magnifications, and
the solvent is water, the water being added at a rate of 2~3 ml per 1 g of the garlic at the step (b).

5. A method of fabricating a natural adhesive using garlic, comprising:
(a) preparing and pulverizing garlic;
(b) adding a solvent into the pulverized garlic;
(c) extracting an extracted liquid from a mixture of the pulverized garlic and water;
(d) filtering the extracted liquid; and
(e) concentrating the filtered extracted liquid,
wherein the method further comprises drying the garlic at a temperature of 80~100° C. for 23 to 25 hours, after the step (a) and before the step (b),
the solvent of the step (b) is water, the water being added at a rate of 2~3 ml per 1 g of the garlic at the step (b), and
the concentration in the step (e) is carried out at a temperature of 55~65° C. at a rate of 9 to 10 magnifications.

6. A method of fabricating a natural adhesive using garlic, comprising:
(a) preparing and pulverizing garlic;
(b) adding a solvent into the pulverized garlic;
(c) extracting an extracted liquid from a mixture of the pulverized garlic and water;
(d) filtering the extracted liquid; and
(e) concentrating the filtered extracted liquid,
wherein the method further comprises drying the garlic at a temperature of 80~100° C. for 23 to 25 hours, after the step (a) and before the step (b), and leaving a mixture of the pulverized garlic and the solvent at a temperature of 80~100° C. for 5 to 7 hours as it is, after the step (b) and before the step (c),
the solvent of the step (b) is water, the water being added at a rate of 2~3 ml per 1 g of the garlic at the step (b), and
the step (c) is carried out at a temperature of 80~100° C.

* * * * *